United States Patent
Bogenschuetz et al.

(10) Patent No.: US 7,490,646 B2
(45) Date of Patent: Feb. 17, 2009

(54) VEHICLE PNEUMATIC TIRE WITH TRANSVERSE GROOVES DEFINING FLANK SEGMENTS HAVING DIFFERENT ANGLES

(75) Inventors: Peter Bogenschuetz, Wedemark (DE); Markus Metz, Neustadt (DE); Frank Walloch, Peine (DE)

(73) Assignee: Continental Aktiengesellschaft, Hannover (DE)

( * ) Notice: Subject to any disclaimer, the term of this patent is extended or adjusted under 35 U.S.C. 154(b) by 217 days.

(21) Appl. No.: 11/088,848

(22) Filed: Mar. 25, 2005

(65) Prior Publication Data
US 2005/0211353 A1  Sep. 29, 2005

(30) Foreign Application Priority Data
Mar. 26, 2004 (EP) .................. 04007321

(51) Int. Cl.
*B60C 11/11* (2006.01)
*B60C 11/13* (2006.01)
(52) U.S. Cl. ............. 152/209.21; 152/209.24; 152/902
(58) Field of Classification Search ........ 152/209.18, 152/209.21, 209.24, 209.28, 902
See application file for complete search history.

(56) References Cited

U.S. PATENT DOCUMENTS

| 4,796,683 | A | * | 1/1989 | Kawabata et al. | 152/209.24 |
| 6,079,464 | A | * | 6/2000 | Hatakenaka et al. | 152/209.24 |
| 2002/0124922 | A1 | * | 9/2002 | Carra et al. | 152/209.18 |

FOREIGN PATENT DOCUMENTS

| JP | 61-200007 | * | 9/1986 |
| JP | 4-345503 | * | 12/1992 |
| JP | 09-002022 | * | 1/1997 |
| JP | 2003-170704 | * | 6/2003 |

OTHER PUBLICATIONS

Patent Abstracts of Japan JP 1 223 006.
Patent Abstracts of Japan JP 61 060 308.

* cited by examiner

*Primary Examiner*—Steven D Maki
(74) *Attorney, Agent, or Firm*—Greenblum & Bernstein, P.L.C.

(57) ABSTRACT

Vehicle pneumatic tire with a rubber tread profile having blocks formed by circumferential grooves and transverse grooves. At least some of the transverse grooves are defined by first and second flank segments. The first and second flank segments have different angles with respect to a radial direction. This Abstract is not intended to define the invention disclosed in the specification, nor intended to limit the scope of the invention in any way.

38 Claims, 2 Drawing Sheets

VEHICLE PNEUMATIC TIRE WITH TRANSVERSE GROOVES DEFINING FLANK SEGMENTS HAVING DIFFERENT ANGLES

CROSS-REFERENCE TO RELATED APPLICATIONS

The present application claims priority under 35 U.S.C. §119 of European Patent Application No. 04 007 321.5, filed on Mar. 26, 2004, the disclosure of which is expressly incorporated by reference herein in its entirety.

BACKGROUND OF THE INVENTION

1. Field of the Invention

The invention relates to a vehicle pneumatic tire with a rubber tread having a profile which features blocks formed by circumferential grooves and by transverse grooves. At least some of the transverse grooves are limited by block flanks featuring flank segments that run at different angles to the radial direction.

2. Discussion of Background Information

A tire with such a tread rubber profile is known from JP 1-223 006 A. The tire has a profile composed of several block rows, whereby the block flanks that limit the circumferential grooves and the transverse grooves feature flank segments that run at different angles to the radial direction. The winter properties of the tire are thus to be improved.

It is known that the braking properties of a tire on a dry surface can be influenced by the stiffness of the tread rubber in the longitudinal direction. In order to improve the braking properties on a dry surface, it is therefore advantageous to provide tread rubber strips in profiles or, when using block rows, to embody the blocks to be as long as possible in the circumferential direction. These measures reduce the proportion of transverse grooves and thus also the number of block edges available, whereby the aquaplaning properties and the braking properties on a wet surface are impaired. It is further customary to orient the block flanks limiting transverse grooves at a rather small angle to the radial direction in order to keep the transverse groove volume as large as possible. This can lead to a greater stress and wear on those block edges, which are primarily stressed during braking. These effects, and the measures for influencing stiffness, are dependent on the direction of rotation of the tire. No effective measures for both directions of rotation have hitherto been available, particularly with tires which are not embodied with directional profiles.

SUMMARY OF THE INVENTION

The invention aims to solve the previous conflict of objectives between good braking properties on a dry surface and good aquaplaning and wet braking properties for tires with profiles that are not embodied in a directional manner, in order to be able to improve these properties in equal measure.

According to the invention, at least some transverse grooves are limited by block flanks featuring two flank segments with different angles with respect to the radial direction, whereby a flank segment with the larger angle is opposite a flank segment with the smaller angle.

The invention thus utilizes, in a particularly advantageous manner, the realization that a larger flank angle in a transverse groove reinforces the respective block in the circumferential direction and stabilizes the respective block edge on the tread periphery when this block is stressed in the direction of rotation. By way of the measure of arranging the flank segments such that a stabilizing flank segment with the larger angle with respect to the radial lies opposite a flank segment with the smaller angle with respect to the radial, the reinforcing effect can be achieved in both directions of rotation of the tire without greatly reducing the groove volume.

In order to guarantee the effectiveness of the measures according to the invention over the width of the tread rubber in both directions of rotation in equal measure, it is advantageous if the flank segments running at a larger angle to the radial and the flank segments lying opposite them are arranged in the individual transverse grooves respectively at corresponding positions.

According to one non-limiting preferred embodiment of the invention, the angle of some flank segments are inclined more steeply with respect to the radial direction and are between approximately 5° and approximately 15°, and in particular, are at least approximately 10°. The angle of other flank segments are inclined less steeply with respect to the radial direction and are between approximately 0° and approximately 5°. The desired stiffening or stabilization of the positive profiles and the transverse groove volume can be balanced particularly well within these ranges.

In order to provide for a more uniform wear of the tread rubber, it is advantageous if the flank angle increases continuously in the transition area from the flank segment with the smaller incline with respect to the radial direction to the flank segment with the larger incline with respect to the radial direction.

According to another embodiment, the angle of the flank segments with the larger incline with respect to the radial direction can increase over the extension of these segments and, in particular, can increase continuously.

The transverse groove volume is largely retained in an advantageous manner when the flank segments with a larger incline with respect to the radial direction end at the groove base have a spacing in the radial direction.

The invention also provides for a vehicle pneumatic tire comprising a rubber tread profile comprising blocks formed by circumferential grooves and transverse grooves. At least some of the transverse grooves are defined by first and second flank segments. The first and second flank segments have different angles with respect to a radial direction.

Each transverse groove may be defined by the first and second flank segments having different angles with respect to the radial direction. The transverse grooves may be defined by the first and second flank segments are arranged in a pattern. The first flank segments may have a greater incline than the second flank segments relative to the radial direction and wherein an angle of the greater incline is between approximately 5° and approximately 15°. An angle of the second flank segments may be between approximately 0° and approximately 5°. The angle may be at least approximately 10°.

An angle of the second flank segments may be between approximately 0° and approximately 5°. The second flank segments may have a smaller incline than the first flank segments relative to the radial direction and wherein an angle of the smaller incline is between approximately 0° and approximately 5°. At least one of the transverse grooves may comprise essentially oppositely arranged first and second groove surfaces, the first groove surface comprising a first flank segment arranged adjacent a second flank segment and the second groove surface comprising a first flank segment arranged adjacent a second flank segment.

The first flank segments may have flank angles which increase continuously in transition areas. At least one of the transverse grooves may comprise essentially oppositely arranged first and second groove surfaces, the first groove surface comprising a first flank segment arranged adjacent a second flank segment and the second groove surface comprising a first flank segment arranged adjacent a second flank segment, and further comprising transition areas arranged between adjacent first and second flank segments. The first flank segments may have flank angles which increase continuously in the transition areas.

The first flank segments may have a greater incline with respect to the radial direction than the second flank segments and wherein an angle of the first flank segments changes along a length of the transverse groove. The first flank segments may have a greater incline with respect to the radial direction than the second flank segments and wherein an angle of the first flank segments increases continuously over along a length of the transverse groove. The first flank segments may have a greater incline with respect to the radial direction than the second flank segments and wherein an angle of the first flank segments extends to an edge which is arranged above a base of the transverse groove.

A groove surface which extends between the base of the transverse groove and the edge arranged above the base of the transverse groove may comprise an angle of between approximately 0° and approximately 5°.

The invention also provides for a vehicle pneumatic tire comprising a tread profile comprising blocks formed by circumferential grooves and transverse grooves. At least some of the transverse grooves are defined by essentially oppositely arranged first and second groove segments. Each first groove segment comprises first and second flank segments arranged adjacent one another. Each second groove segment comprises first and second flank segments arranged adjacent one another. The first and second flank segments have different angles with respect to a radial direction.

The first flank segment of the first groove segment may be arranged essentially opposite the second flank segment of the second groove segment and the first flank segment of the second groove segment may be arranged essentially opposite the second flank segment of the first groove segment.

The invention also provides for a vehicle pneumatic tire comprising a tread profile comprising blocks formed by circumferential grooves and transverse grooves. At least some of the transverse grooves are defined by essentially oppositely arranged first and second groove segments. Each first groove segment comprises first and second flank segments and a transition area connecting the first and second flank segments. Each second groove segment comprises first and second flank segments and a transition area connecting the first and second flank segments. The first and second flank segments have different angles with respect to a radial direction.

The first flank segment of the first groove segment may be arranged essentially opposite the second flank segment of the second groove segment and the first flank segment of the second groove segment may be arranged essentially opposite the second flank segment of the first groove segment.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2a shows a section along the line A-A of FIG. 2;

FIG. 2b shows a section along the line B-B of FIG. 2;

FIG. 3 shows an alternative embodiment of the invention in a section corresponding to FIG. 2a.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
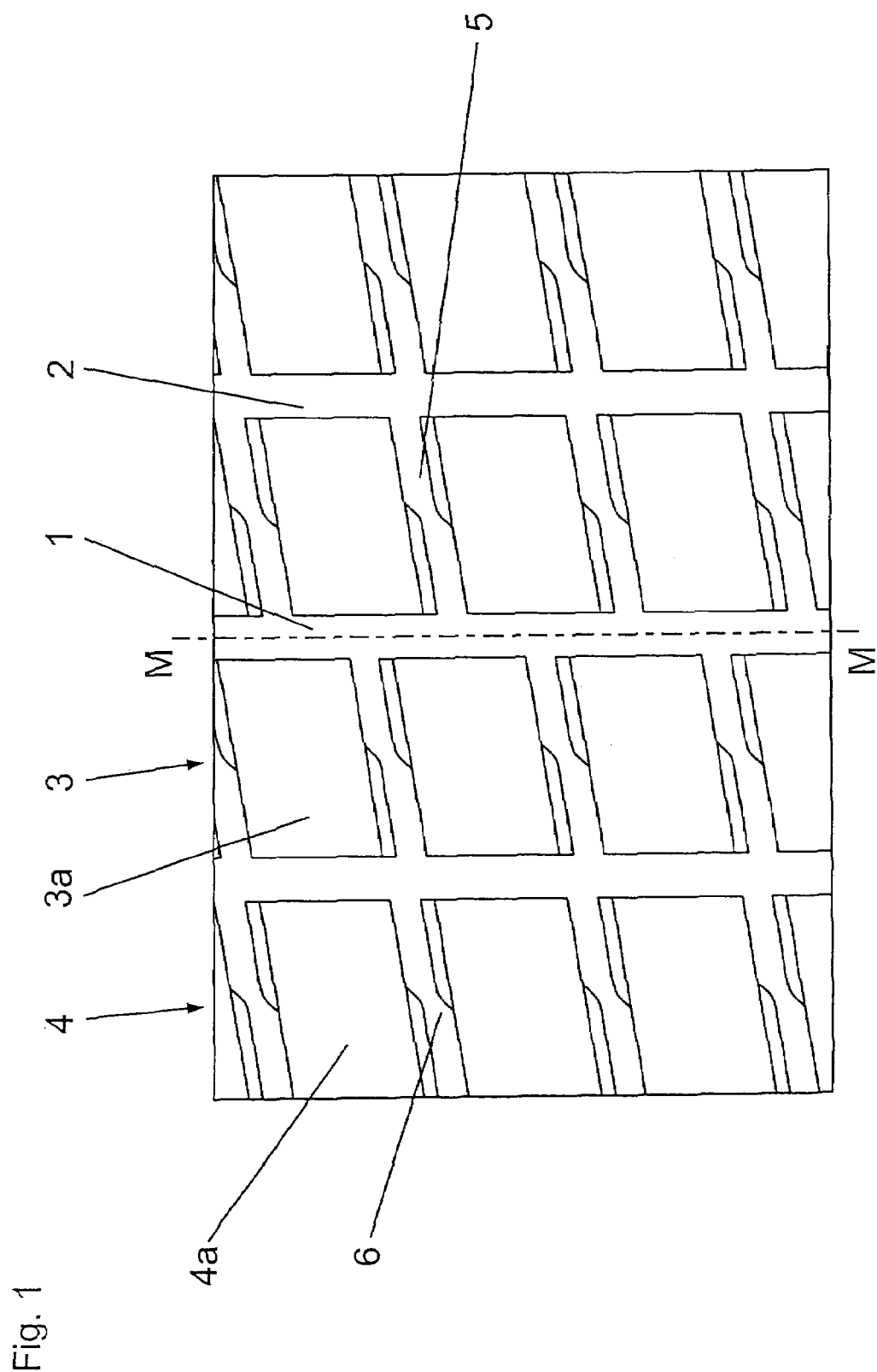
FIG. 1 shows a plan view of a partial section of a profile of a rubber tread.

FIG. 1 shows a simplified embodiment of a profile for a rubber tread of a vehicle pneumatic tire for automobiles, whereby the profile shown features properties independent of the direction of rotation of the tire. The tread rubber features a wide circumferential groove 1 running along the equator line M-M in the circumferential direction. Each tread rubber half defined by the groove 1 includes two block rows 3, 4 which are separated from one another by respectively one further wide groove 2, also running in the circumferential direction.

The inner block rows 3 constitute two center block rows and the outer block rows 4 constitute shoulder block rows which are located on the outside of the tread rubber. In the shoulder block rows 4 and the center block rows 3, the blocks 4a, 5a following one another in the circumferential direction are separated from one another by respective transverse grooves 6 and 5.

Figure 2:
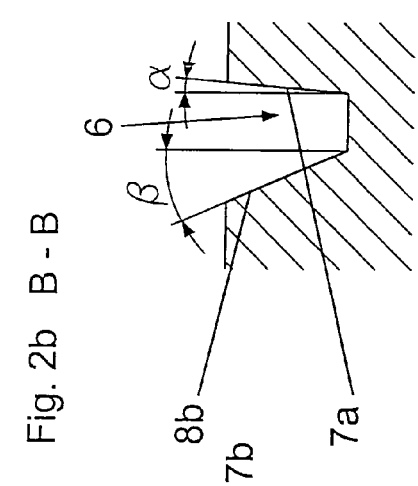
FIG. 2 shows in an enlarged scale, a plan view of a transverse groove.

The invention lies in a special embodiment of the block flanks 7, 8 limiting the transverse grooves 5, 6. A preferred embodiment will now be described on the basis of FIGS. 2, 2a and 2b. These figures show a shoulder transverse groove 6 and the block flanks 7, 8 limiting it. The block flanks 7, 8 are respectively composed of two flank segments 7a, 7b and 8a, 8b. Flank segment 7a and flank segment 8a are each embodied in the conventional manner and run at a preferably constant angle "α" to the radial direction. This angle "α" is chosen to have an order of magnitude of between approximately 0° and approximately 5°. Flank segments 7b and 8b are respectively connected to flank segments 7a and 8a and are embodied such that they run in the radial direction over most of their extension at a preferably constant angle "β". The angle "β" is greater than the angle "α" and is chosen to be in particular between approximately 5° and approximately 15°, and is, in particular, greater than approximately 10°. In the embodiment shown, the transition areas of the two flank sections 7a, 8a or 7b, 8b are an exception, in which, as the drawing figures show, the flank angle increases continuously from the size of the angle "α" to the size of the larger angle "β". The transition area thereby covers a small area of the length of the transverse groove 6 (and also groove 5), e.g., in the order of magnitude of between approximately 10% to approximately 15% of the transverse groove length. The arrangement of the flank segments 7a, 7b or 8a, 8b lying opposite one another is of particular importance. As FIGS. 2, 2a and 2b show, the flank segment 8b is located opposite the flank segment 7a and the flank segment 8a is located opposite the flank segment 7b. In the preferred embodiment, the two transition areas thereby also lie opposite one another so that, as shown in particular by FIG. 2, the groove base of the transverse groove 6 is at least essentially of equal width over the course of the transverse groove 6.

Through the particular mutual arrangement of the flank segments 7a, 7b, or 8a, 8b, it is possible to guarantee the advantages of a large flank angle for the two block flanks limiting a transverse groove and thus in both possible directions of rotation of the tire. The stabilizing effect that can be achieved with the flank segments 7b, 8a with the greater flank angle "β" results in both directions of rotation without the groove volume being reduced too much, as would be the case with an increase of the flank angle over the entire length of the block flanks limiting the transverse groove.

In all the transverse grooves embodied according to the invention, the arrangement of the flank segments is preferably made in a consistent manner, as shown, e.g., by FIG. 1.

Figure 3:
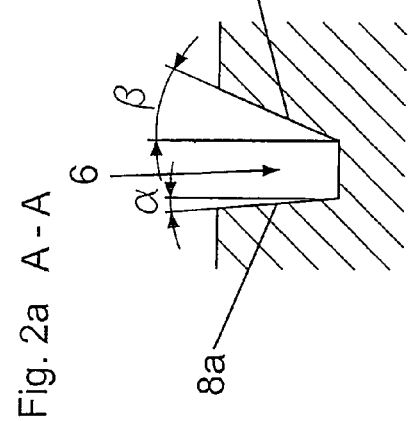
Figure 3:
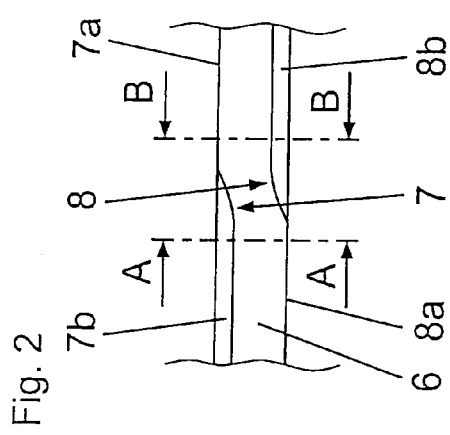

FIG. 3 shows a possible variant of the embodiment of the flank segment 7b or 8b with a greater incline. The flank segment starts from the tread periphery and does not reach the groove base.

Figure 4:
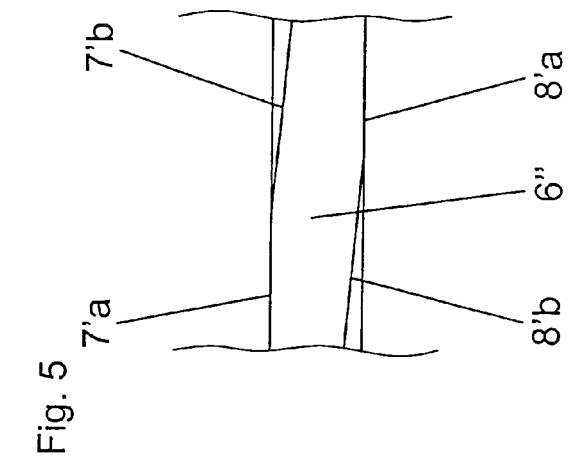
FIGS. 4 and 5 show plan views of further embodiments of transverse grooves embodied according to the invention.

A further embodiment of the invention with a transverse groove 6' having a bending point is shown in FIG. 4. The transverse groove 6' runs flat and/or straight in a v-shaped manner. The flank segments 7b or 8b with a greater incline are connected to the bending points 7c, 8c of the block flanks such that the groove base likewise runs in a v-shaped manner.

Figure 5:
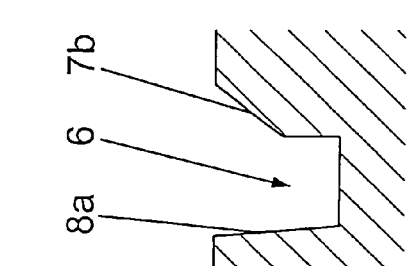

FIG. 5 shows a variant of the invention on the basis of a transverse groove 6" running straight. The flank angle "β" of the flank segments 7'b or 8'b with a greater incline increases continuously over a large part of the extension of the segments 7'b, 8'b. In the embodiment shown, the enlargement of the flank angle occurs starting from the ends of the flank segments 7'b or 8'b located in the central area of the transverse groove 6".

The invention is not restricted to the embodiments shown. Thus in particular combinations with one another of the individual embodiment variants shown and described are possible. Furthermore, block flanks embodied according to the invention do not need to cover the entire length of the transverse grooves. It is further possible to provide transverse grooves embodied in a conventional manner in a tread rubber profile together with transverse grooves with block flanks embodied according to the invention. Block flanks embodied according to the invention can be provided, e.g., only in the central area or only in the shoulder areas. Furthermore, with one and the same tread rubber, the positions of the flank segments can be selected to be consistent in one block row but to be deviating in another block row.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A vehicle pneumatic tire comprising:
   a rubber tread profile comprising blocks formed by circumferential grooves and transverse grooves; and
   at least some of the transverse grooves being defined by first and second flank segments and a transition area arranged between the first and second flank segments,
   wherein the first and second flank segments have different angles with respect to a radial direction,
   wherein the first and second flank segments have a constant angle over most of their length and from a tread surface to a groove base of the transverse groove, and
   wherein an angle of the transition area changes continuously from the first flank segment to the second flank segment.

2. The vehicle pneumatic tire of claim 1, wherein each transverse groove is defined by the first and second flank segments having different angles with respect to the radial direction.

3. The vehicle pneumatic tire of claim 1, wherein the transverse grooves defined by the first and second flank segments are arranged in a non-directional pattern.

4. The vehicle pneumatic tire of claim 1, wherein the first flank segments have a greater incline than the second flank segments relative to the radial direction and wherein an angle of the greater incline is between approximately 5° and approximately 15°.

5. The vehicle pneumatic tire of claim 4, wherein an angle of the second flank segments is between approximately 0° and approximately 5°.

6. The vehicle pneumatic tire of claim 4, wherein the angle is at least approximately 10°.

7. The vehicle pneumatic tire of claim 6, wherein an angle of the second flank segments is between approximately 0° and approximately 5°.

8. The vehicle pneumatic tire of claim 1, wherein the second flank segments have a smaller incline than the first flank segments relative to the radial direction and wherein an angle of the smaller incline is between approximately 0° and approximately 5°.

9. The vehicle pneumatic tire of claim 1, wherein at least one of the transverse grooves comprise essentially oppositely arranged first and second groove surfaces, the first groove surface comprising a first flank segment arranged adjacent a second flank segment and the second groove surface comprising a first flank segment arranged adjacent a second flank segment.

10. The vehicle pneumatic tire of claim 1, wherein each transition area has a curved bottom edge where the transition area meets the groove base.

11. The vehicle pneumatic tire of claim 1, wherein at least one of the transverse grooves comprise essentially oppositely arranged first and second groove surfaces, the first groove surface comprising a first flank segment arranged adjacent a second flank segment and the second groove surface comprising a first flank segment arranged adjacent a second flank segment, and wherein the transition area comprises transition areas arranged between adjacent first and second flank segments.

12. The vehicle pneumatic tire of claim 11, wherein the transition areas each have a curved bottom edge where the transition area meets the groove base.

13. The vehicle pneumatic tire of claim 1, wherein the first flank segments have a greater incline with respect to the radial direction than the second flank segments and wherein an angle of the first flank segments changes along a remainder of the length thereof.

14. The vehicle pneumatic tire of claim 1, wherein the first flank segments have a greater incline with respect to the radial direction than the second flank segments and wherein an angle of the first flank segments increases continuously over along a remainder of the length thereof.

15. The vehicle pneumatic tire of claim 1, wherein other transverse grooves comprise first flank segments having a greater incline with respect to the radial direction than second flank segments and wherein an angle of the first flank segments of the other transverse grooves extends to an edge which is arranged above a base of the transverse groove.

16. The vehicle pneumatic tire of claim 1, wherein a groove surface which extends between the base of another transverse groove and the edge arranged above the base of another transverse groove comprises an angle of between approximately 0° and approximately 5°.

17. The vehicle pneumatic tire of claim 1, wherein the at least some of the transverse grooves comprise oppositely arranged transition areas whose angle changes continuously from the first flank segment to the second flank segment.

18. The vehicle pneumatic tire of claim 1, wherein the rubber tread profile comprises center block rows and shoulder block rows arranged on opposite sides of a central circumferential groove, and wherein the blocks of the center block rows have a same outer configuration as the blocks of the shoulder block rows.

19. The vehicle pneumatic tire of claim 1, wherein each transition area extends to the groove base.

20. The vehicle pneumatic tire of claim 1, wherein the groove base of each transverse groove is at least essentially of equal width over a course of the transverse groove.

21. The vehicle pneumatic tire of claim 1, wherein the first flank segment extends to a block corner having an acute angle and that the second flank segment extends to another block corner having an obtuse angle.

22. The vehicle pneumatic tire of claim 1, wherein other transverse grooves having first and second flank segments are V-shaped and comprise a bending point arranged between the first and second flank segments.

23. A vehicle pneumatic tire comprising:
a tread profile comprising blocks formed by circumferential grooves and transverse grooves;
at least some of the transverse grooves being defined by essentially oppositely arranged first and second groove segments;
each first groove segment comprising first and second flank segments arranged adjacent one another and a transition area arranged between the first and second flank segments; and
each second groove segment comprising first and second flank segments arranged adjacent one another and a transition area arranged between the first and second flank segments,
wherein the first and second flank segments have different angles with respect to a radial direction,
wherein the first and second flank segments have a constant angle over most of their length and from a tread surface to a groove base of the transverse groove, and
wherein an angle of each transition area changes continuously from the first flank segment to the second flank segment.

24. The vehicle pneumatic tire of claim 23, wherein the first flank segment of the first groove segment is arranged essentially opposite the second flank segment of the second groove segment and wherein the first flank segment of the second groove segment is arranged essentially opposite the second flank segment of the first groove segment.

25. The vehicle pneumatic tire of claim 23, wherein the at least some of the transverse grooves comprise oppositely arranged transition areas whose angle changes continuously from the first flank segment to the second flank segment.

26. The vehicle pneumatic tire of claim 23, wherein the tread profile comprises center block rows and shoulder block rows arranged on opposite sides of a central circumferential groove, and wherein the blocks of the center block rows have a same outer configuration as the blocks of the shoulder block rows.

27. The vehicle pneumatic tire of claim 23, wherein each transition area extends to the groove base.

28. The vehicle pneumatic tire of claim 23, wherein the groove base of each transverse groove is at least essentially of equal width over a course of the transverse groove.

29. The vehicle pneumatic tire of claim 23, wherein first flank segment extends to a block corner having an acute angle and that the second flank segment extends to another block corner having an obtuse angle.

30. The vehicle pneumatic tire of claim 23, wherein other transverse grooves having first and second flank segments are V-shaped and comprise a bending point arranged between the first and second flank segments.

31. A vehicle pneumatic tire comprising:
a tread profile comprising blocks formed by circumferential grooves and transverse grooves;
at least some of the transverse grooves being defined by essentially oppositely arranged first and second groove segments;
each first groove segment comprising first and second flank segments and a transition area connecting the first and second flank segments; and
each second groove segment comprising first and second flank segments and a transition area connecting the first and second flank segments,
wherein the first and second flank segments have different angles with respect to a radial direction,
wherein the first and second flank segments have a constant angle over most of their length and from a tread surface to a groove base of the transverse groove,
wherein an angle of each transition area changes continuously from the first flank segment to the second flank segment, and
wherein the transition area covers approximately 10% to approximately 15% of the transverse groove length.

32. The vehicle pneumatic tire of claim 31, wherein the first flank segment of the first groove segment is arranged essentially opposite the second flank segment of the second groove segment and wherein the first flank segment of the second groove segment is arranged essentially opposite the second flank segment of the first groove segment.

33. The vehicle pneumatic tire of claim 31, wherein the at least some of the transverse grooves comprise oppositely arranged transition areas whose angle changes continuously from the first flank segment to the second flank segment.

34. The vehicle pneumatic tire of claim 31, wherein the tread profile comprises center block rows and shoulder block rows arranged on opposite sides of a central circumferential groove, and wherein the blocks of the center block rows have a same outer configuration as the blocks of the shoulder block rows.

35. The vehicle pneumatic tire of claim 31, wherein each transition area extends to the groove base.

36. The vehicle pneumatic tire of claim 31, wherein the groove base of each transverse groove is at least essentially of equal width over a course of the transverse groove.

37. The vehicle pneumatic tire of claim 31, wherein the first flank segments extends to a block corner having an acute angle and that the second flank segment extends to another block corner having an obtuse angle.

38. The vehicle pneumatic tire of claim 31, wherein other transverse grooves having first and second flank segments are V-shaped and comprise a bending point arranged between the first and second flank segments.

* * * * *